(12) United States Patent
Kim et al.

(10) Patent No.: US 11,198,272 B2
(45) Date of Patent: Dec. 14, 2021

(54) STEEL SHEET FOR HOT PRESS FORMED MEMBER HAVING EXCELLENT COATING ADHESION AND MANUFACTURING METHOD FOR THE SAME

(71) Applicant: POSCO, Pohang-si (KR)

(72) Inventors: Seong-Woo Kim, Gwangyang-si (KR); Jin-Keun Oh, Gwangyang-si (KR); A-Ra Cho, Incheon (KR); Hyeon-Jeong Shin, Incheon (KR)

(73) Assignee: POSCO, Gyeongsangbuk-Do (KR)

( * ) Notice: Subject to any disclaimer, the term of this patent is extended or adjusted under 35 U.S.C. 154(b) by 162 days.

(21) Appl. No.: 16/617,862

(22) PCT Filed: May 31, 2018

(86) PCT No.: PCT/KR2018/006258
§ 371 (c)(1),
(2) Date: Nov. 27, 2019

(87) PCT Pub. No.: WO2018/221991
PCT Pub. Date: Dec. 6, 2018

(65) Prior Publication Data
US 2020/0190620 A1     Jun. 18, 2020

(30) Foreign Application Priority Data

Jun. 1, 2017  (KR) .................. 10-2017-0068651
Aug. 10, 2017 (KR) .................. 10-2017-0101557

(51) Int. Cl.
*C21D 9/46*    (2006.01)
*C21D 6/00*    (2006.01)
(Continued)

(52) U.S. Cl.
CPC ............ *B32B 15/012* (2013.01); *B21D 22/02* (2013.01); *B21D 22/022* (2013.01); *B21D 35/00* (2013.01); *B21D 35/005* (2013.01); *B32B 15/01* (2013.01); *B32B 15/011* (2013.01); *B32B 15/013* (2013.01); *B32B 15/04* (2013.01); *B32B 15/043* (2013.01); *B32B 15/18* (2013.01); *C21D 6/005* (2013.01); *C21D 6/008* (2013.01); *C21D 9/46* (2013.01); *C22C 21/00* (2013.01); *C22C 30/00* (2013.01); *C22C 38/001* (2013.01); *C22C 38/002* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/18* (2013.01); *C22C 38/20* (2013.01); *C22C 38/22* (2013.01); *C22C 38/24* (2013.01); *C22C 38/26* (2013.01); *C22C 38/28* (2013.01); *C22C 38/32* (2013.01); *C22C 38/38* (2013.01);
(Continued)

(58) Field of Classification Search
CPC ...... B21D 22/02; B21D 22/022; B21D 35/00; B21D 35/005; B32B 15/01; B32B 15/011; B32B 15/012; B32B 15/013; B32B 15/04; B32B 15/043; B32B 15/18; C21D 6/005; C21D 6/008; C21D 9/46; C22C 21/00; C22C 30/00; C22C 38/001; C22C 38/002; C22C 38/02; C22C 38/04; C22C 38/06; C22C 38/08; C22C 38/12; C22C 38/14; C22C 38/16; C22C 38/18; C22C 38/20; C22C 38/22; C22C 38/24; C22C 38/26; C22C 38/28; C22C 38/32; C22C 38/38; C22C 38/40; C22C 38/42; C22C 38/44; C22C 38/46; C22C 38/48; C22C 38/50; C22C 38/54; C22C 38/58; C22F 1/002; C22F 1/04; C23C 2/04; C23C 2/06; C23C 2/12; C23C 2/26; C23C 2/28; C23C 2/40; C23C 26/00; C23C 28/023; C23C 28/321; C23C 28/322; C23C 30/00; C23C 30/005; C23F 17/00; Y10T 428/12757; Y10T 428/12799; Y10T 428/12958; Y10T 428/12972; Y10T 428/12979; Y10T 428/12993
See application file for complete search history.

(56) References Cited

U.S. PATENT DOCUMENTS 5,356,724 A   10/1994  Tsuda et al.
6,296,805 B1  10/2001  Laurent et al.
(Continued)

FOREIGN PATENT DOCUMENTS

CN    1255272     5/2006
CN    101960034   1/2011
(Continued)

OTHER PUBLICATIONS

Chinese Office Action—Chinese Application No. 201880036255.X dated Sep. 1, 2020, citing KR 10-1696121, CN 103261466, CN 103429774, CN 104220641, and JP 2003-535976.
(Continued)

*Primary Examiner* — Jenny R Wu
(74) *Attorney, Agent, or Firm* — Cantor Colburn LLP

(57) ABSTRACT

Provided is a steel sheet for a hot press formed member having excellent coating adhesion, and a method for manufacturing the same. A steel sheet for hot press forming is an aluminum alloy plated steel sheet, wherein an average Fe content in a plating layer may be 40 wt % or more, and a concentration gradient of a section having a Fe content of 45 wt % to 80 wt % in the plating layer may 7 wt %/μm or less of a concentration gradient at a section having an Fe content of 45% to 80% in the plating layer in a thickness direction from a surface of the plating layer according to a result of GDS analysis.

8 Claims, 3 Drawing Sheets

(51) Int. Cl.

| | |
|---|---|
| *C23C 2/12* | (2006.01) |
| *C23C 2/28* | (2006.01) |
| *C23C 2/40* | (2006.01) |
| *C23F 17/00* | (2006.01) |
| *C22C 38/06* | (2006.01) |
| *C22C 38/04* | (2006.01) |
| *C22C 38/02* | (2006.01) |
| *C22C 38/00* | (2006.01) |
| *B32B 15/01* | (2006.01) |
| *C22C 38/28* | (2006.01) |
| *C22C 38/32* | (2006.01) |
| *B21D 22/02* | (2006.01) |
| *C22F 1/00* | (2006.01) |
| *C22F 1/04* | (2006.01) |
| *B21D 35/00* | (2006.01) |
| *C23C 26/00* | (2006.01) |
| *C23C 28/02* | (2006.01) |
| *C23C 30/00* | (2006.01) |
| *C23C 28/00* | (2006.01) |
| *B32B 15/18* | (2006.01) |
| *C23C 2/04* | (2006.01) |
| *B32B 15/04* | (2006.01) |
| *C23C 2/26* | (2006.01) |
| *C23C 2/06* | (2006.01) |
| *C22C 30/00* | (2006.01) |
| *C22C 38/14* | (2006.01) |
| *C22C 38/48* | (2006.01) |
| *C22C 38/40* | (2006.01) |
| *C22C 38/18* | (2006.01) |
| *C22C 38/42* | (2006.01) |
| *C22C 38/44* | (2006.01) |
| *C22C 38/08* | (2006.01) |
| *C22C 38/16* | (2006.01) |
| *C22C 38/24* | (2006.01) |
| *C22C 21/00* | (2006.01) |
| *C22C 38/38* | (2006.01) |
| *C22C 38/46* | (2006.01) |
| *C22C 38/20* | (2006.01) |
| *C22C 38/26* | (2006.01) |
| *C22C 38/22* | (2006.01) |
| *C22C 38/58* | (2006.01) |
| *C22C 38/12* | (2006.01) |
| *C22C 38/50* | (2006.01) |
| *C22C 38/54* | (2006.01) |

(52) U.S. Cl.
CPC .............. *C22C 38/40* (2013.01); *C22C 38/42* (2013.01); *C22C 38/44* (2013.01); *C22C 38/46* (2013.01); *C22C 38/48* (2013.01); *C22C 38/50* (2013.01); *C22C 38/54* (2013.01); *C22C 38/58* (2013.01); *C22F 1/002* (2013.01); *C22F 1/04* (2013.01); *C23C 2/04* (2013.01); *C23C 2/06* (2013.01); *C23C 2/12* (2013.01); *C23C 2/26* (2013.01); *C23C 2/28* (2013.01); *C23C 2/40* (2013.01); *C23C 26/00* (2013.01); *C23C 28/023* (2013.01); *C23C 28/321* (2013.01); *C23C 28/322* (2013.01); *C23C 30/00* (2013.01); *C23C 30/005* (2013.01); *C23F 17/00* (2013.01); *Y10T 428/12757* (2015.01); *Y10T 428/12799* (2015.01); *Y10T 428/12958* (2015.01); *Y10T 428/12972* (2015.01); *Y10T 428/12979* (2015.01); *Y10T 428/12993* (2015.01)

(56) References Cited

U.S. PATENT DOCUMENTS

| | | |
|---|---|---|
| 2004/0009366 A1 | 1/2004 | Takagi et al. |
| 2011/0008647 A1 | 1/2011 | Azuma et al. |
| 2011/0030441 A1 | 2/2011 | Maki et al. |
| 2013/0220490 A1 | 8/2013 | Hayashi et al. |
| 2013/0280552 A1 | 10/2013 | Bae et al. |
| 2013/0340899 A1 | 12/2013 | Kusumi et al. |
| 2014/0120366 A1 | 5/2014 | Sohn |
| 2014/0363697 A1 | 12/2014 | Kim et al. |
| 2015/0017474 A1 | 1/2015 | Harako et al. |
| 2015/0044499 A1 | 2/2015 | Maki et al. |
| 2016/0376679 A1 | 12/2016 | Kim et al. |
| 2019/0003029 A1 | 1/2019 | Oh et al. |

FOREIGN PATENT DOCUMENTS

| | | |
|---|---|---|
| CN | 102066615 | 5/2011 |
| CN | 102089451 | 6/2011 |
| CN | 103168106 | 6/2013 |
| CN | 103261466 | 8/2013 |
| CN | 103429774 | 12/2013 |
| CN | 103764866 | 4/2014 |
| CN | 104024464 | 9/2014 |
| CN | 104145039 | 11/2014 |
| CN | 104220641 | 12/2014 |
| EP | 2312005 | 4/2011 |
| EP | 2527481 | 11/2012 |
| JP | S59056569 | 4/1984 |
| JP | H05255890 | 10/1993 |
| JP | 2003535976 | 12/2003 |
| JP | 2004002931 | 1/2004 |
| JP | 2004043887 | 2/2004 |
| JP | 2004176181 | 6/2004 |
| JP | 2009256733 | 11/2009 |
| JP | 2011512455 | 4/2011 |
| JP | 2011137210 | 7/2011 |
| JP | 2012082511 | 4/2012 |
| JP | 2013221202 | 10/2013 |
| JP | 2015131995 | 7/2015 |
| JP | 2016006224 | 1/2016 |
| JP | 2019506523 | 3/2019 |
| KR | 20100112602 | 10/2010 |
| KR | 20130002227 | 1/2013 |
| KR | 101536703 | 7/2015 |
| KR | 20150075435 | 7/2015 |
| KR | 101569505 | 11/2015 |
| KR | 101696121 | 1/2017 |
| WO | 2001094664 | 12/2001 |
| WO | 2009090443 | 7/2009 |
| WO | 2010005121 | 1/2010 |
| WO | 2018096387 | 5/2018 |

OTHER PUBLICATIONS

Chinese Office Action—Chinese Application No. 201880036329.X dated Sep. 1, 2020, citing KR 10-1696121, CN 102066615, CN 104024464, CN 104145039, and JP S59-53569.

U.S. Office Action—U.S. Appl. No. 16/617,798 dated Oct. 16, 2020, citing KR10-1696121 and U.S. Pat. No. 5,356,724.

International Search Report—PCT/KR2018/006258 dated Oct. 2, 2018.

Japanese Office Action—Japanese Application No. 2019-565849 dated Dec. 8, 2020, citing KR 10-1696121, WO 2010/005121, JP 2013-221202, JP 2004-043887, KR 10-2915-0073021, and JP 2012-082511.

Japanese Office Action—Japanese Application No. 2019-565854 dated Nov. 24, 2020, citing KR 10-2015-0075435, KR 10-1696121, JP 2004-043887, JP 2011-137210, and JP 2004-002931.

Japanese Office Action—Japanese Application No. 2019-565877 dated Dec. 1, 2020, citing JP 2011-512455, KR 10-1696121, JP 2009-256733, JP H05-255890, JP 2019-506523, WO 2010-005121, JP 2004-176181, WO 2018/096387, and KR 10-2010-0112602.

(56) References Cited

OTHER PUBLICATIONS

Chinese Office Action—Chinese Application No. 201880035473.1 dated Jun. 18, 2020, citing CN 103429774, CN 101960034, CN 1255272, CN 103168106, CN 103764866, CN 102089451, and KR 101696121.
European Search Report—European Application No. 18808695.3 dated May 19, 2020, citing KR 101696121, EP 2312005, and SUEHIRO, et al.
European Search Report—European Application No. 18810215.6 dated May 19, 2020, citing KR 101696121, EP 2312005, and SUEHIRO, et al.
European Search Report—European Application No. 18810671.0 dated May 26, 2020, citing KR 101696121, EP 2527481, and EP 2312005.
Suehiro, et al., Properties of Aluminum-coated Steels for Hot-forming, Nippon Steel Technical Report, No. 88, Jul. 2003, pp. 16-21.
Japanese Office Action—Japanese Application No. 2019-565854 dated Aug. 3, 2021, citing KR 10-2015-0075435, Yang, et al., JP 2004-043887, JP 2011-137210, JP 2004-002931, and KR 10-1696121.
Japanese Office Action—Japanese Application No. 2019-565877 dated Aug. 3, 2021, citing JP 2011-512455, JP 2016-006224, KR 10-1696121, JP 2009-256733, JP H05-255890, JP 2019-506523, WO 2010/005121, JP 2004-176181, WO 2018/096387, and KR 10-2010-0112602.
Yang, et al., Effect of Nb addition on structure and mechanical properties of FeAl coating, Surface & Coatings Technology, Mar. 2015, vol. 270, pp. 221-226.

STEEL SHEET FOR HOT PRESS FORMED MEMBER HAVING EXCELLENT COATING ADHESION AND MANUFACTURING METHOD FOR THE SAME

CROSS-REFERENCE TO RELATED APPLICATIONS

This application is a national entry of PCT Application No. PCT/KR2018/006258 filed on May 31, 2018, which claims priority to and the benefit of Korean Application No. 10-2017-0068651 filed on Jun. 1, 2017; and Korean Application No. 10-2017-0101557 filed on Aug. 10, 2017, in the Korean Patent Office, the entire contents of which are incorporated herein by reference.

TECHNICAL FIELD

The present disclosure relates to a steel sheet for a hot press formed member having excellent coating adhesion, and a method for manufacturing the same.

BACKGROUND ART

In recent years, due to depletion of petroleum energy resources and high interest in environmental protection, regulations on improving the fuel efficiency of automobiles are becoming stronger.

In terms of materials, reducing a thickness of a steel sheet used in automobiles is one method for improving the fuel efficiency of automobiles; however, reducing the thickness of a steel sheet may cause problems in the safety of automobiles, such that the strength of the steel sheet should be supported.

Thus, demand for high-strength steel sheets has been continuously generated, and various kinds of steel sheets have been developed. However, since these steel sheets have high strength in themselves, there is a problem that workability thereof is poor. That is, since a product of strength and elongation for each grade of steel sheet tends to always have a constant value, when the strength of the steel sheet increases, there may be a problem that elongation, an index of workability, decreases.

In order to solve this problem, a hot press forming method has been proposed. The hot press forming method is a method of forming a low temperature structure, such as martensite, in a steel sheet by forming at a high temperature suitable for forming and then quenching the steel sheet at a low temperature to increase the strength of the final product. In this case, there is an advantage that the problem of workability may be significantly reduced when manufacturing a member having high strength.

However, according to the above-described hot press forming method, there may be a problem in that a surface of the steel sheet may be oxidized, since the steel sheet needs to be heated to a high temperature, and thus, a process of removing an oxide from the surface of the steel sheet after the press forming should be added.

In order to solve this problem, the disclosure, U.S. Pat. No. 6,296,805 has been proposed. In the above-described disclosure, the steel sheet subjected to aluminum plating is used in a process of hot press forming or heating and quenching after room temperature forming (briefly, post-heat treatment). Since an aluminum plated layer is present on the surface of the steel sheet, the steel sheet is not oxidized at the time of heating.

However, there are some cases in which two or more hot press formed members are adhered to each other via an adhesive to be used, which require sufficient adhesion strength. To measure the adhesion strength, a test method is often used to determine whether the adhesion is easily maintained even at high strength by applying tensile stress in a direction perpendicular to the adhesion surface.

The test method frequently results in a case in which the plating layer is peeled off inside the plating layer or at an interface between the plating layer and the base steel sheet. In this case, the two members are separated even at low stress.

DISCLOSURE

Technical Problem

An aspect of the present disclosure is to provide a steel sheet for a hot press formed member having excellent coating adhesion, and a method for manufacturing the same.

The problem to address in the present disclosure is not limited thereto. One of ordinary skill in the art would have no difficulty in understanding additional problems of the present disclosure based on overall features of the present disclosure.

Technical Solution

According to an aspect of the present disclosure, a steel sheet for a hot press formed member, may comprise: 40 wt % or more of an Fe average content in a plating layer; and 7 wt %/μm or less of a concentration gradient at a section having an Fe content of 45% to 80% in the plating layer in a thickness direction from a surface of the plating layer according to a result of GDS analysis, wherein the steel sheet is an aluminum alloy plated steel sheet.

In an embodiment of the present disclosure, the concentration gradient may be 5 wt %/μm or less.

In an embodiment of the present disclosure, the aluminum alloy plating layer may have an average content of Fe of 50 wt % or more.

In an embodiment of the present disclosure, the base steel sheet may include a composition including, by wt %, carbon (C): 0.04% to 0.5%, silicon (Si): 0.01% to 2%, manganese (Mn): 0.01% to 10%, aluminum (Al): 0.001% to 1.0%, phosphorus (P): 0.05% or less, sulfur (S): 0.02% or less, nitrogen (N): 0.02% or less, and residual Fe and inevitable impurities.

In an embodiment of the present disclosure, the composition of the base steel sheet may further include, by wt %, one or more among, a sum of one or more selected from a group consisting of Cr, Mo and W: 0.01% to 4.0%, a sum of one or more selected from a group consisting of Ti, Nb, Zr and V: 0.001% to 0.4%, Cu+Ni: 0.005% to 2.0%, Sb+Sn: 0.001% to 1.0%, and B: 0.0001% to 0.01%.

According to an aspect of the present disclosure, a manufacturing method of a steel sheet for a hot press formed member, includes: aluminum plating a surface of a base steel sheet and coiling to obtain an aluminum plated steel sheet; annealing the aluminum plated steel sheet to obtain an aluminum alloy plated steel sheet; and cooling the aluminum alloy plated steel sheet. An amount of the aluminum plating is 30 g/m² to 200 g/m² based on one side of the steel sheet, and a coiling rate after the Al plating until the temperature is 250° C. is set to 20° C./sec or less, while allowing coiling tension to be 0.5 kg/mm² to 5 kg/mm² during coiling. The annealing is performed for 30 minutes to 50 hours in a heating temperature range of 550° C. to 750° C. in a batch annealing furnace. When heating is performed from room temperature to the heating temperature during the annealing, an average temperature increase rate is 20° C./h to 100° C./h, and an average temperature increase rate in a section of 400° C. to 500° C. is 1° C./h to 15° C./h, while a difference between atmospheric temperature and a temperature of the steel sheet in the batch annealing furnace is 5° C. to 80° C.

In an embodiment of the present disclosure, the base steel sheet may include a composition, including, by wt %, carbon (C): 0.04% to 0.5%, silicon (Si): 0.01% to 2%, manganese (Mn): 0.01% to 10%, aluminum (Al): 0.001% to 1.0%, phosphorus (P): 0.05% or less, sulfur (S): 0.02% or less, nitrogen (N): 0.02% or less, and residual Fe and inevitable impurities.

In an embodiment of the present disclosure, the composition of the base steel sheet may further include, by wt %, one or more among, a sum of one or more selected from a group consisting of Cr, Mo and W: 0.01% to 4.0%, a sum of one or more selected from a group consisting of Ti, Nb, Zr and V: 0.001% to 0.4%, Cu+Ni: 0.005% to 2.0%, Sb+Sn: 0.001% to 1.0%, and B: 0.0001% to 0.01%.

Advantageous Effects

According to one aspect of the present disclosure, as a steel sheet for hot press forming is plated with an Al—Fe-based plating layer, a likelihood that voids occur in the plating layer in a subsequent hot press forming process is reduced. Accordingly, a likelihood that the plating layer is peeled off by the voids at the interior thereof may be reduced even when two or more hot press formed members are adhered to each other via an adhesive to be used. This may lead to high adhesion strength.

BEST MODE

Figure 1:
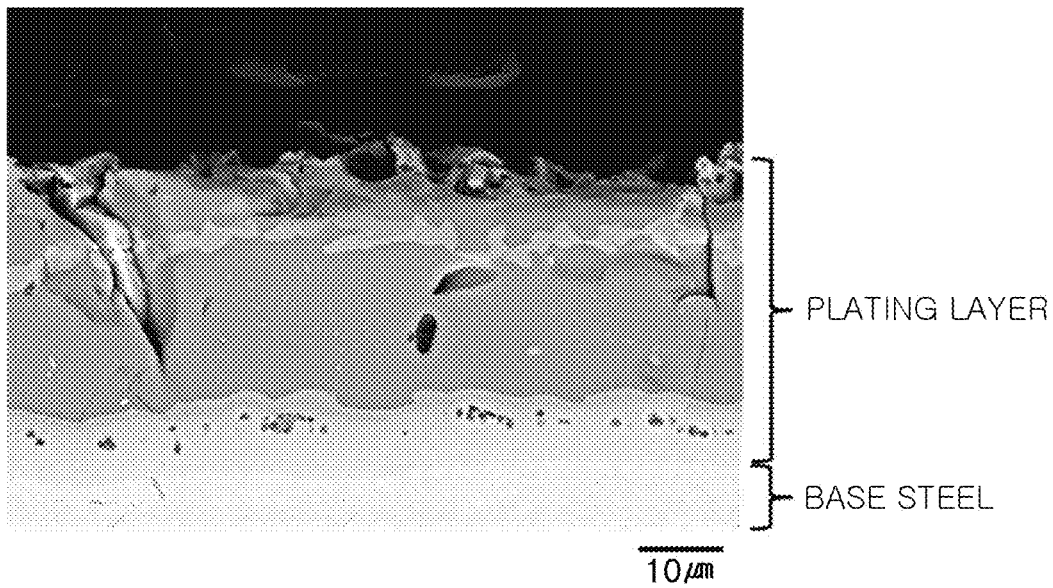
FIG. 1 is cross-sectional an image of a plating layer of hot press-formed member in which peeling-off of the plating layer occurred.

Hereinafter, the present disclosure will be described in detail.

In the present disclosure, the term "member" refers to a component manufactured by hot press forming or a material for the component. In addition, the term "steel sheet" means a steel sheet before hot press forming, and the steel sheet may be wound during a manufacturing process to have a coil form. In this case, the steel sheet is also called as a "coil".

The inventors of the present disclosure carried out researches over various areas to investigate the reason of the peeling-off of the plating layer which causes the decrease of adhesion strength. As a result, it was confirmed that there was cases that fine voids exist in a lower portion of the plating layer of the hot press formed member. It was also confirmed that the adhesion strength may be decreased in the cases.

That is, fine voids present in a lower portion (a point from an interface between the plating layer and the base steel to 15 μm in the case of a conventional plating amount, although this may vary according to a thickness of the plating layer) of the plating layer cross section of the hot press-formed member may cause a reduction in the adhesion strength of the plating layer. Cracks are generated at the voids as a starting point and propagated in the plating layer, thereby causing the plating layer to be peeled off.

It has been investigated according to a result of researches of the present inventors that the generation of voids can be suppressed or encouraged depending on how a shape of the plating layer of the steel sheet for hot press forming can be controlled. The present disclosure is to provide a plating layer preventing the void generation.

Although it was not firmly confirmed, the voids of a hot press-forming member, as a mechanism of void generation, may be generated by an imbalance between diffusion rates of Fe in the base steel and Al in the plating layer occurring during heating of the hot press molding process, involving heating at a relatively high speed. In other words, the Fe diffuses at a relatively low speed while the Al diffuses at a relatively high speed, and as a result, it seems that the voids are generated because a position where Al is diffused and removed cannot be filled with the Fe.

To prevent such problems, a composition of the plating layer of the steel sheet is controlled in the present disclosure. By having a large amount of the Fe diffused in the plating layer of the steel sheet before the hot press forming, a magnitude of the imbalance between diffusion amounts of the Fe and Al is to be reduced during the heating for the hot press forming by controlling the diffusion amounts to be not significant.

Accordingly, the steel sheet for hot press forming of the present disclosure, as an aluminum alloy plated steel sheet, is characterized in that an average content of Fe in the plating layer is 40 wt % or more, preferably 50 wt % or more and a concentration gradient thereof is 7 wt %/μm or less at a section having an Fe content of 45% to 80% in the plating layer in a thickness direction from a surface of the plating layer according to a result of GDS analysis.

When the average content of Fe is low, there is still likelihood that voids may occur since the amounts of Al and Fe diffused during the hot press forming process is large. Accordingly, the Fe content in the plating layer needs to be limited to said range. Although an upper limit of the average content of Fe does not need to be specifically defined, the upper limit may be set to 80 wt % considering efficiency of alloying, and the like. The average content of Fe means an average value of Fe content in an entire plating layer, and there may be several measuring methods. In this embodiment, however, a curve of a content of Fe according to a depth (thickness), which appears when analyzed from a surface of the plating layer to an interfacial surface of the steel sheet by glow discharge emission spectrometry (GDS), may be integrated, the integral value may be divided by a thickness of the plating layer, and a result value may be used as an average content of Fe. There may be more than one reference to determine an interfacial surface between the plating layer and the steel sheet, and in an embodiment, a point at which a content of Fe is 92% of a content of Fe of base material on the basis of a result of the GDS may be determined as an interfacial surface between the plating layer and the steel sheet.

In addition, the present inventors found that in order to reduce the generation of voids, as well as controlling the Fe average content in the plating layer, the concentration gradient of Fe at the position where the voids are mainly generated needs to be gentle.

Accordingly, the sheet for hot press forming of the present disclosure, as an aluminum alloy plated steel sheet, is featured in that a concentration gradient is 7 wt %/μm or less of a section having an Fe content of 45% to 80% in the plating layer from a surface of the plating layer in a thickness direction according to a result of GDS analysis. That is, when a difference in the Fe contents (wt %) at an initial point and an end point of the section divided by a length (μm) of the section is 7 wt %/μm or less, the diffusion of Al and Fe in an additional heating process for hot press forming is not abrupt, thereby preventing the void generation. In addition, there may be a section in which an Fe increase or decrease changes (from increase to decrease or from decrease to increase) within said section, but the Fe content should fall within the range of 45% to 80% at all points in the section. In addition, the concentration gradient of Fe means the one of lowest corresponding area (farthest area from the surface) if there are several corresponding areas in the plating layer. According to another embodiment, the concentration gradient may be 5 wt %/μm or less. A lower limit of the concentration gradient does not need to be particularly defined; however, as the concentration gradient generally has a positive value in a view that the Fe content near the base steel sheet is high and that on a surface is low in the section for obtaining the concentration gradient, a lower limit of the concentration gradient in one embodiment of the present invention may also be set to 0 wt %/μm; however, a lower limit is not limited thereto. Even a negative concentration gradient does not adversely affect the purposes of the present disclosure. Further, it is general that there are positions where the Fe contents are 80% and 45% in the plating layer; in this case, a difference of the Fe content is fixed to 35 wt % by weight as long as a length of said content section is 7 μm or more.

The steel sheet is a steel sheet for hot press forming, and if used for hot press forming, a composition thereof is not particularly limited. However, according to one aspect of the present disclosure, by wt % (hereinafter, unless noted otherwise, it is necessary to note that the composition of the steel sheet and the plated layer is based on weight), the steel sheet and the plated layer of the present disclosure may have the composition including, by wt %, C: 0.04 to 0.5%, Si: 0.01 to 2%, Mn: 0.01 to 10%, Al: 0.001 to 1.0%, P: 0.05% or less, S: 0.02% or less, and N: 0.02% or less.

C: 0.04 to 0.5%

C may be added in an appropriate amount as an essential element for increasing the strength of a heat treatment member. That is, in order to secure sufficient strength in the heat treatment member, the C may be added in an amount of 0.04% or more. In one embodiment, a lower limit of the C content may be 0.1%. However, if the content thereof is too high, in the case of manufacturing a cold rolled material, when the hot rolled material is cold-rolled, the strength of a hot rolled material is so high that cold rollability is greatly inferior, and spot weldability is also greatly reduced. Thus, C may be added in an amount of 0.5% or less to secure sufficient cold rollability and spot weldability. In addition, the C content may be limited to 0.45% or less or 0.4% or less.

Si: 0.01 to 2%

Si not only needs to be added as a deoxidizer in steelmaking, but also suppresses the formation of a carbide which most affects the strength of the member for hot press forming, and in the hot press forming, Si serves to secure residual austenite by concentrating carbon to the grain boundaries of martensite lath after forming martensite. Therefore, Si may be added in an amount of 0.01% or more. In addition, when aluminum plating is performed on the steel sheet after rolling, an upper limit may be set to be 2% in order to secure sufficient plating properties. In one embodiment of the present disclosure, the Si content may be limited to 1.5% or less.

Mn: 0.01 to 10%

Mn may be added in an amount of 0.01% or more in order to secure a solid solution strengthening effect and to lower a critical cooling rate for securing martensite in the member for hot press forming. In addition, the Mn content may be 10% or less in terms of securing workability of the hot press forming process by appropriately maintaining the strength of the steel sheet, reducing manufacturing costs, and improving spot weldability, and in one embodiment of the present disclosure, Mn may be included in an amount of 9% or less, or 8% or less.

Al: 0.001 to 1.0%

Al may be added in an amount of 0.001% or more since Al deoxidizes in steelmaking, together with Si, to increase cleanliness of steel, Al may be added in an amount of 0.001% or more. In addition, the content of Al may be 1.0% or less in order to prevent an Ac3 temperature from becoming too high so that heating required during hot press forming may be performed in an appropriate temperature range.

P: 0.05% or Less

P is present as an impurity in steel, and the smaller the content thereof is, the more advantageous. Therefore, in one embodiment of the present disclosure, P may be included in an amount of 0.05% or less. In another embodiment of the present disclosure, P may be limited to 0.03% or less. Since less P is an advantageous impurity element, there is no need to particularly set an upper limit of the content thereof. However, in order to excessively lower the P content, there is a possibility that manufacturing costs may increase, and in consideration thereof, a lower limit thereof may be set to be 0.001%.

S: 0.02% or Less

S is an impurity in steel, and the maximum content is 0.02% (preferably 0.01% or less) since S is an element that deteriorates ductility, impact characteristics, and weldability of a member. In addition, since manufacturing costs may increase when a minimum content thereof is less than 0.0001%, in one embodiment of the present disclosure, a lower limit of the content thereof may be 0.0001%.

N: 0.02% or Less

N is an element included as an impurity in steel, and in order to reduce sensitivity for crack generation during slab continuous casting, and to secure impact characteristics, the lower the content is, the more advantageous, and thus, N may be included in an amount of 0.02% or less. Although a lower limit does not need to particularly determined, the N content may be set to be 0.001% or more in one embodiment of in consideration of an increase in manufacturing costs, or the like.

In the present disclosure, if necessary, in addition to the above-described steel composition, one or more of a sum of one or more selected from a group consisting of Cr, Mo, and W: 0.01 to 4.0%, a sum of one or more selected from a group consisting of Ti, Nb, Zr and V: 0.001 to 0.4%, Cu+Ni: 0.005 to 2.0%, Sb+Sn: 0.001 to 1.0%, and B: 0.0001 to 0.01% may further be added.

A sum of one or more selected from a group consisting of Cr, Mo and W: 0.01% to 4.0%

Cr, Mo, and W may improve hardenability and secure grain refinement and the strength through a precipitation strengthening effect, such that one or more these may be added in an amount of 0.01% or more, based on the total content. In addition, in order to secure weldability of the member, the content thereof may be limited to 4.0% or less. In addition, when the content of these elements exceeds 4.0%, a further increase in an effect is also not great, so when the content thereof is limited to 4.0% or less, it is also possible to prevent an increase in costs due to the addition of additional elements.

A sum of one or more selected from a group consisting of Ti, Nb, Zr and V: 0.001 to 0.4%

Ti, Nb, and V are effective in improving the steel sheet of the heat treatment member by forming fine precipitates, and in stabilizing retained austenite and improving impact toughness by grain refinement, such that it (they) may be added in an amount of 0.001% or more of one or more based on the total content. However, if an added amount exceeds 0.4%, an effect thereof is not only saturated, but also an increase in costs by the addition of excessive ferroalloy may be caused.

Cu+Ni: 0.005 to 2.0%

Cu and Ni are elements forming fine precipitates to improve strength. In order to obtain the above-described effects, a sum of one or more these elements may be 0.005% or more. However, if the value exceeds 2.0%, a cost increases excessively, so an upper limit thereof is 2.0%.

Sb+Sn: 0.001 to 1.0%,

Sb and Sn may be concentrated on a surface during an annealing heat treatment for Al—Si plating to suppress the formation of a Si or Mn oxide on the surface to improve plating properties. Sb and Sn may be added in an amount of 0.001% or more in order to obtain such an effect. However, if an added amount exceeds 1.0%, since besides an excessive ferroalloy cost, solid solution at slab grain boundaries may cause coil edge cracks during hot rolling, an upper limit is 1.0%.

B: 0.0001 to 0.01%

B is an element that can not only improve hardenability but also be segregated in an old austenite grain boundary, and suppress brittleness of the member for hot forming due to grain boundary segregation of P or/and S by addition of a small amount. Therefore, B may be added in an amount of 0.001% or more. However, if a content exceeds 0.01%, the effect is not only saturated, but also causes brittleness in hot rolling, so an upper limit thereof may be 0.01%, and in one embodiment, the content of B may be 0.005% or less.

Iron and inevitable impurities may be mentioned as a remainder other than the above-mentioned elements, and the element that can be included in the steel sheet for hot forming is not particularly limited.

Hereinafter an example of manufacturing method of steel for hot press forming is disclosed. However, a method of manufacturing a steel sheet for hot press forming described below is a mere example and it does not mean that the steel sheet for hot press forming of the present disclosure should be manufactured by the present manufacturing method, and it is to be noted that any manufacturing method meets the claims of the present disclosure and there is no problem in implementing each embodiment of the present disclosure.

The steel sheet of the present disclosure may be obtained by using a hot-rolled or a cold-rolled steel sheet, by performing molten aluminum plating on the surface of the base steel sheet, and performing an annealing treatment on the plated steel sheet.

[Aluminum Plating Process]

In an embodiment of the present disclosure, a process of preparing a base steel sheet, aluminum plating a surface of the base steel sheet under appropriate conditions and coiling is performed to obtain an aluminum plated steel sheet (coil).

Aluminum plating of the surface of the base steel sheet in a plating amount of 30 $g/m^2$ to 200 $g/m^2$ for each side An aluminum plating treatment may be performed on a surface of the rolled steel sheet. Aluminum plating may usually include AlSi plating (which may contain 80% or more of Al and 5% to 20% of Si, and additional elements as required), named as a type I, and any plating containing 90% or more of Al and additional elements as required, named as a type II. Hot dip aluminum plating may be performed to form a plating layer, and an annealing treatment may be performed on the steel sheet before plating. An appropriate plating amount when plating is 30 $g/m^2$ to 200 $g/m^2$ per one side surface. When the plating amount is too large, it may take an excessive time to alloy to the surface, whereas when the plating amount is too small, it may be difficult to obtain sufficient corrosion resistance.

Controlling a cooling rate after Al plating to 20° C./sec until 250° C.

The cooling rate after the Al plating affects formation of a diffusion prohibition layer between the plating layer and the base steel. When the cooling is too fast, the diffusion prohibition layer is not uniformly formed, thereby alloying behavior of the coil may be not uniform during subsequent annealing. Accordingly, the cooling rate after the Al plating may be 20° C./sec or less until the temperature is 250° C.

Coiling tension after plating is set to be 0.5 $kg/mm^2$ to ~5 $kg/mm^2$

When a coil is obtained by coiling the steel sheet after plating, coiling tension of the coil may be adjusted. According to the adjustment of the coiling tension of the coil, an alloying behavior and a surface quality of the coil may be changed during a subsequent annealing treatment.

[Annealing Treatment Process]

An aluminum plated steel sheet obtained by the above-described process is subjected to annealing under the following conditions to obtain an aluminum alloy plated steel sheet.

Performing annealing for 30 minutes to 50 hours in a range of 550° C. to 750° C. in a batch annealing furnace An aluminum plated steel sheet (coil) is heated in a batch annealing furnace. When heating the steel sheet, it is desirable that a heat treatment target temperature and a holding time be maintained for 30 minutes to 50 hours in a range of 550° C. to 750° C. based on a temperature of the steel sheet (in the present disclosure, a highest temperature at which a material reaches in this temperature range is called as a heating temperature). The holding time is the time after a coil temperature reaches a target temperature until the start of cooling. In one embodiment of the present disclosure, when alloying is not sufficiently performed, a plating layer may be peeled off during roll leveling, such that a heating temperature may be 550° C. or higher for sufficient alloying. In addition, the heating temperature may be 750° C. or less in order to prevent excessive generation of oxides on a surface layer and to secure spot weldability. Further, in order to sufficiently secure the plating layer and prevent a decrease in productivity, the holding time may be set to be 30 minutes to 50 hours. In one embodiment, a temperature of the steel sheet may have a heating pattern in which the temperature continues to rise without a cooling process until a heating temperature is reached.

Heating to a heating temperature with an average time increase rate of 20° C./h to 100° C./h When heating the steel sheet at the above-described heating temperature, in order to secure sufficient productivity and to uniformly alloy the plating layer on all steel sheets (coils), the average temperature increase rate may be 20° C./h to 100° C./h based on the steel sheet (coil) temperature for an entire temperature section (a section from room temperature to a heating temperature). In addition, an overall average temperature increase rate may be controlled in the above numerical range, but in one embodiment, as described later, a temperature increase rate of a specific temperature section may be also controlled to achieve the object of the present disclosure.

Heating at an average temperature increase rate of 1° C./h to 15° C./h in a section of 400° C. to 500° C. at the time of temperature increase In one embodiment of the present disclosure, in order to secure sufficient productivity while preventing rolling oil remaining in the temperature range in which the rolling oil mixed during rolling is vaporized to cause surface stains, it may be heated at the average temperature increase rate of 1 to 15° C./h in the section of 400° C. to 500° C. at the time of temperature increase. In one embodiment of the present disclosure, a lower limit of the average temperature increase rate in the section of 400° C. to 500° C. at the time of the temperature increase may be 3° C./hr, and in another embodiment, a lower limit of the average temperature increase rate in the section of 400 to 500° C. at the time of the temperature increase may be also 4° C./hr.

Controlling a difference between an atmospheric temperature and a temperature of the steel sheet in a batch annealing furnace to be 5° C. to 80° C.

In general, heating of the batch annealing furnace employs a method of heating the steel sheet (coil) by increasing the atmospheric temperature in the annealing furnace, rather than a method of directly heating the steel sheet (coil). In this case, the difference between an atmospheric temperature and the coil temperature may not be avoided. However, the difference between the atmospheric temperature and the steel sheet temperature may be 80° C. or less, based on a point in time at which the heat treatment target temperature is reached in order to significantly reduce variations in materials and plating quality for each position in the steel sheet. It is ideal that the temperature difference should be as small as possible, but since this slows down the temperature increase rate, and thus it may be difficult to meet the overall average temperature increase rate, the temperature difference may be 5° C. or more in consideration thereof. The temperature of the steel sheet means a temperature measured in a bottom part of the charged steel sheet (coil) (a lowest portion of the coil), and the atmospheric temperature means a temperature measured at a center of the internal space of the heating furnace.

BEST MODE

Hereinafter, the present disclosure will be described more specifically through embodiments. It should be noted, however, that the following embodiments are intended to illustrate the present disclosure in more detail and not to limit the scope of the present disclosure. The scope of the present disclosure is determined by the matters set forth in the claims and the matters reasonably inferred therefrom.

EXAMPLES

Manufacturing a Steel Sheet

Inventive Example 1

A cold-rolled steel sheet for a hot press forming process having a composition as in Table 1 below was prepared. A surface of the steel sheet was plated using a type I plating bath having a composition of Al-9% Si-2.5% Fe. A plating amount during plating was adjusted to be 50 g/m² on each side. After the plating, cooling was performed at 8° C./sec until the temperature is lowered to 250° C. and coiling tension was adjusted to be 2.8 kg/mm².

TABLE 1

| Element | C | Si | Mn | Al | P | S | N | Additional Element |
|---------|---|-----|-----|------|-------|-------|-------|---------------------|
| Content(%) | 0.24 | 0.1 | 1.2 | 0.03 | 0.008 | 0.002 | 0.003 | Cr 0.15, B 0.003 |

The plated steel sheet was heated to 650° C. in a batch annealing furnace under the following conditions:

an overall average temperature increase rate to 650° C.: 25° C./h an average temperature increase rate in a temperature section of 400° C. to 500° C.: 5° C./h a temperature difference between atmosphere and the steel sheet at the heating temperature: 15° C.

After heating, the steel sheet was maintained at a constant temperature for 20 hours, and the steel sheet was then air cooled to obtain a steel sheet for hot press forming.

Figure 2:
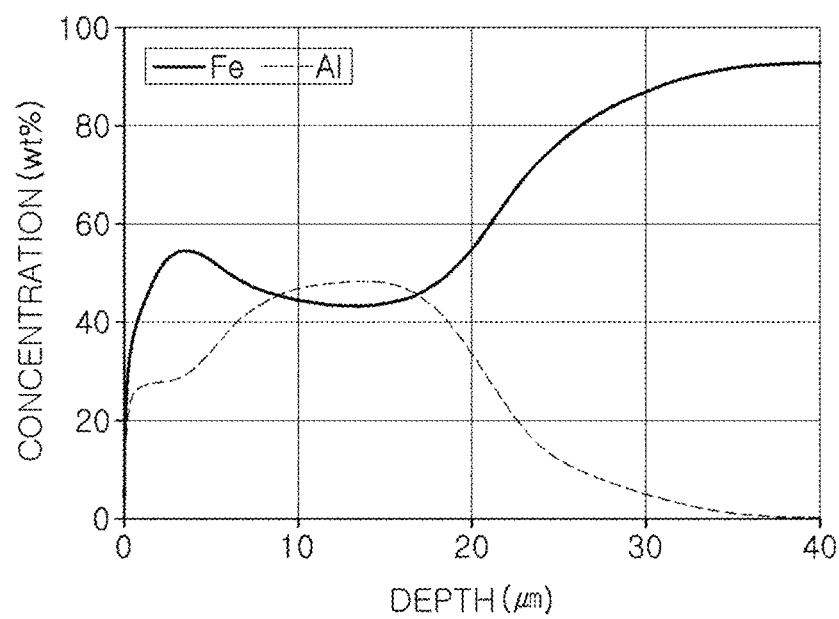
FIG. 2 is a composition profile of the plating layer of a steel sheet manufactured according to Inventive Example 1 analyzed by a GDS analyzer.

According to a result of analysis of the plating layer of the steel sheet using a GDS, a composition profile as in FIG. 2 was obtained, and an average content of Fe calculated based on the analysis was 59.4 wt %. A concentration gradient of a section having an Fe content of 45% to 80% in the plating layer was 3.6 wt %/μm.

Inventive Example 2

A surface of the steel sheet having the composition shown in Table 1 above was plated using a type I plating bath having an Al-9% Si-2.5% Fe composition. A plating amount during plating was adjusted to 70 g/m² on each side, and after the Al plating, cooling to 250° C. was performed at a cooling rate of 11° C./sec followed by adjusting coiling tension to 3.2 kg/mm².

The plated steel sheet was then heated to 700° C. in a batch annealing furnace under the following conditions:

an overall average temperature increase rate to 700° C.: 30° C./h an average temperature increase rate in a temperature section of 400° C. to 500° C.: 7° C./h a temperature difference between atmospheric and the steel sheet at a heating temperature: 30° C.

After heating, the plated steel sheet was maintained at a constant temperature for 10 hours, and the steel sheet was air-cooled to obtain a steel sheet for hot press forming.

Figure 3:
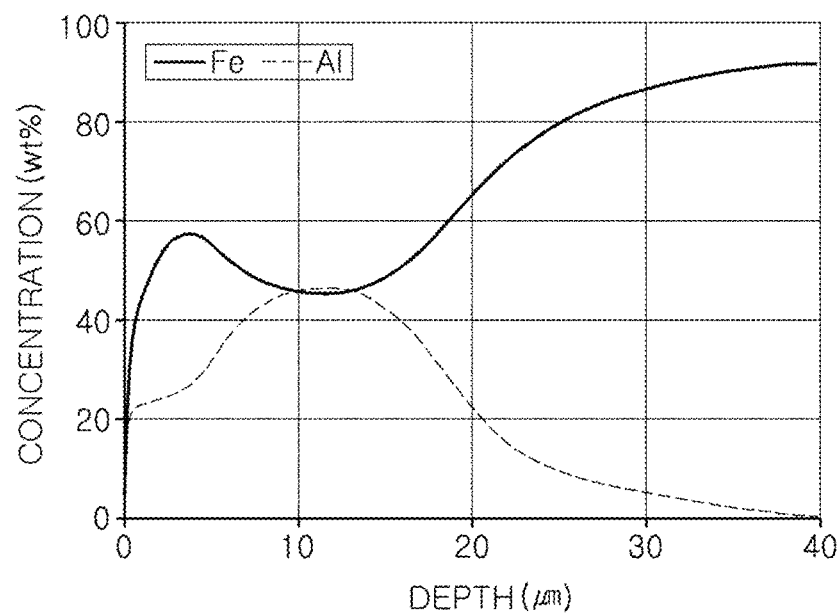
FIG. 3 is a composition profile of the plating layer of a steel sheet manufactured according to Inventive Example 2 analyzed by a GDS analyzer.

According to a result of analysis of the plating layer of the steel sheet using a GDS, a composition profile as in FIG. 3 was obtained, and an average content of Fe calculated based on the analysis was 63.7 wt %. A concentration gradient of a section having an Fe content of 45% to 80% in the plating layer was 1.5 wt %/μm.

Comparative Example 1

The same aluminum plated steel sheet as in Inventive Example 1 to which the same plating process was performed and the heating and cooling processes were not performed was used as Comparative Example 1.

Figure 4:
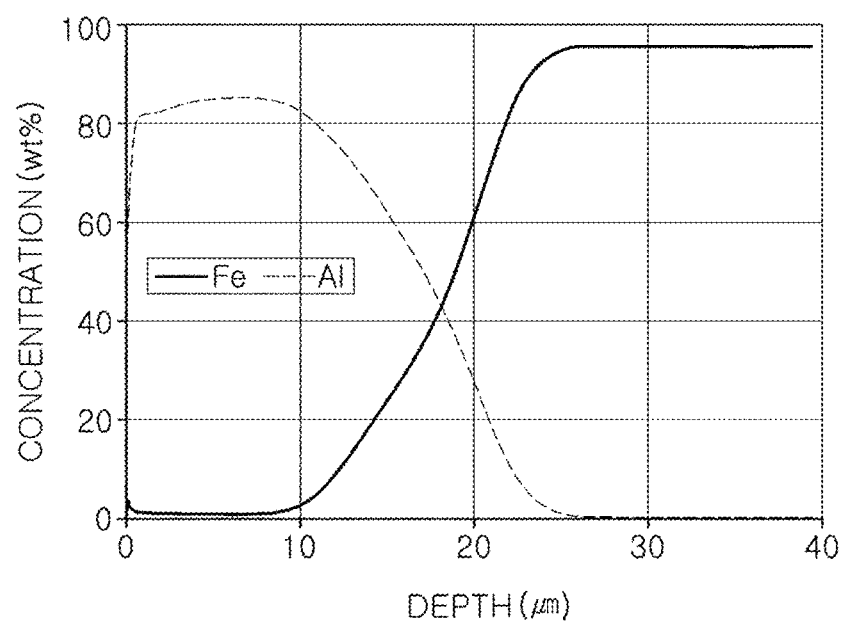
FIG. 4 is a composition profile of the plating layer of a steel sheet manufactured according to Comparative Example 1 analyzed by a GDS analyzer.

According to a result of analysis of the plating layer of the steel sheet using a GDS, a composition profile as in FIG. 4 was obtained, and an average content of Fe calculated based on the analysis was 22.6 wt %. A concentration gradient of a section having an Fe content of 45% to 80% in the plating layer was 10.1 wt %/μm.

Comparative Example 2

The same aluminum plated steel sheet as in Inventive Example 2 to which the same plating process was performed and the heating and cooling processes were not performed was used as Comparative Example 2.

Figure 5:
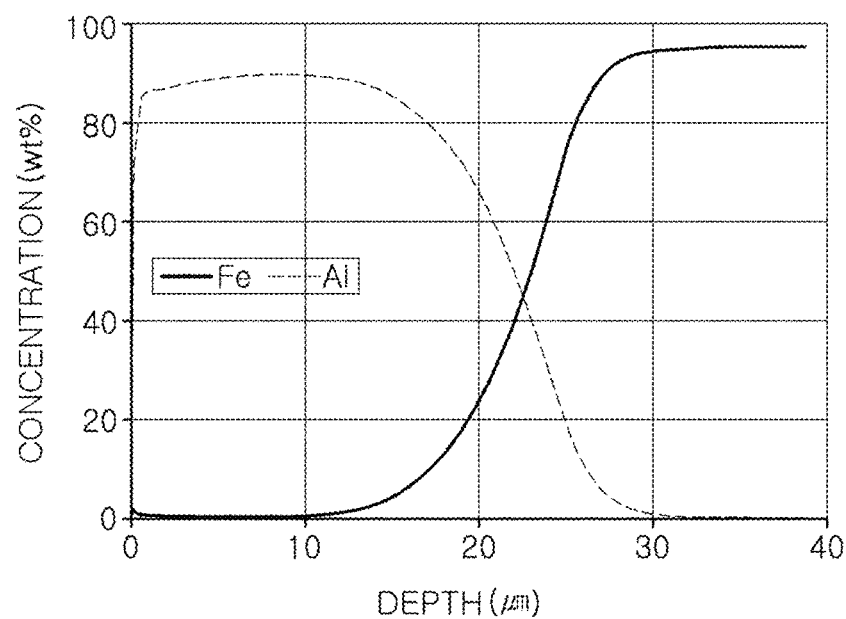
FIG. 5 is a composition profile of the plating layer of a steel sheet manufactured according to Comparative Example 2 analyzed by a GDS analyzer.
Figure 6:
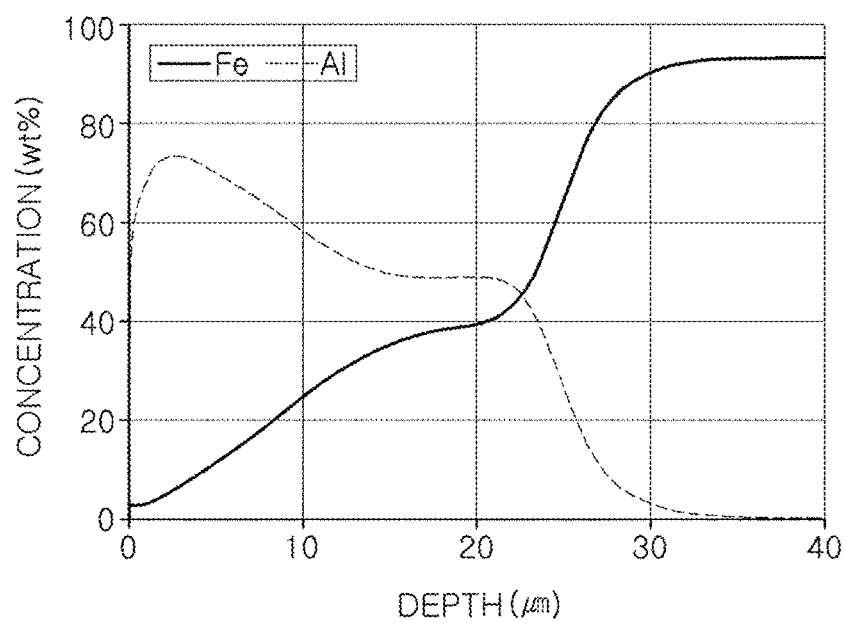
FIG. 6 is a composition profile of the plating layer of a steel sheet manufactured according to Comparative Example 3 analyzed by a GDS analyzer.

According to a result of analysis of the plating layer of the steel sheet using a GDS, a composition profile as in FIG. 5 was obtained, and an average content of Fe calculated based on the analysis was 18.3 wt %. A concentration gradient of a section having an Fe content of 45% to 80% in the plating layer was 11.1 wt %/μm.

Comparative Example 3

A surface of the steel sheet having the composition shown in Table 1 above was plated using a type I plating bath having an Al-9% Si-2.5% Fe composition. A plating amount during plating was adjusted to 70 g/m$^2$ on each side, and after the Al plating, cooling to 250° C. was performed at a cooling rate of 25° C./sec followed by adjusting coiling tension to 3.2 kg/mm$^2$.

The plated steel sheet was then heated to 600° C. in a batch annealing furnace under the following conditions:

an overall average temperature increase rate to 600° C.: 150° C./h an average temperature increase rate in a temperature section of 400° C. to 500° C.: 100° C./h a temperature difference between atmospheric and the steel sheet at a heating temperature: 50° C.

After heating, the plated steel sheet was maintained at a constant temperature for 2 hours, and the steel sheet was air-cooled to obtain a steel sheet for hot press forming.

According to a result of analysis of the plating layer of the steel sheet using a GDS, a composition profile as in FIG. 4 was obtained, and an average content of Fe calculated based on the analysis was 36.6 wt %. A concentration gradient of a section having an Fe content of 45% to 80% in the plating layer was 8 wt %/μm.

Hot Press Forming

The steel sheets of Inventive Examples 1 and 2 and Comparative Examples 1 to 3 were heated to 950° C. at a temperature increase rate of 6.2° C./sec, were maintained at said temperature for five minutes. A hot press forming process in which the steel sheets were rapidly cooled while being pressured by a press was then performed to obtain a hot press formed member.

A portion of the obtained member was sampled to observe a cross-section thereof, and a number of voids generated per unit area was measured from an interface between the plating layer and the steel sheet to 15 μm (a lower portion of the cross-section of the plating layer).

Further, two members of the same Inventive Example or Comparative Example was adhered using an adhesive for a structure while sizing an adhesion surface of the members at 25.4 mm×12.7 mm and were observed as to whether the adhesion surface was separated after applying a load of about 90% of allowable adhesive strength of the adhesive in a direction perpendicular to the adhesion surface.

TABLE 2

| Classification | Number of voids per 1000 μm$^2$ of lower surface cross sectional area | Separation of adhesion surface |
| --- | --- | --- |
| Inventive Example 1 | No voids observed | Not separated |
| Inventive Example 2 | No voids observed | Not separated |
| Comparative Example 1 | 16.3 | Separated |
| Comparative Example 2 | 18.1 | Separated |
| Comparative Example 3 | 10.6 | Partially separated |

As shown in Table 2 above, the hot press forming members manufactured from the steel sheets of Inventive Examples 1 and 2 had almost no voids, whereas those manufactured from the steel sheets of Comparative Examples 1 and 2 had more than 16.3 voids per 1000 μm$^2$ cross section, thereby giving rise to separation of adhesion surfaces. When the adhesion surface was observed, however, it was found that the separation occurred in the plating layer, not on the layer of adhesive. Comparative Example 3 showed a considerable number of voids although a smaller number of the voids were shown compared to Comparative Example 1 or 2; when a load was applied, the adhesion surface was not separated. When the adhesive was removed using a solvent and the adhesion interface was observed after the testing, the separation occurred in the plating layer.

Therefore, as suggested by the present invention, it could be confirmed that securing an Fe content in the steel sheet for hot press forming to a pre-determined level or more is advantageous in securing the coating adhesion.

The invention claimed is:

1. A steel sheet for a hot press formed member comprising:
   40 wt % or more of an Fe average content in a plating layer;
   and
   7 wt %/μm or less of a concentration gradient at a section having an Fe content of 45 wt % to 80 wt % in the plating layer in a thickness direction from a surface of the plating layer according to a result of GDS analysis, wherein the steel sheet is an aluminum alloy plated steel sheet.

2. The steel sheet of claim 1, wherein the concentration gradient is 5 wt %/μm or less.

3. The steel sheet of claim 1, wherein an average content of Fe of the aluminum alloy plated steel sheet is 50 wt % or more.

4. The steel sheet of claim 1, wherein the base steel sheet comprises a composition comprising, by wt %, carbon (C): 0.04% to 0.5%, silicon (Si): 0.01% to 2%, manganese (Mn): 0.01% to 10%, aluminum (A): 0.001% to 1.0%, phosphorus (P): 0.05% or less, sulfur (S): 0.02% or less, nitrogen (N): 0.02% or less, and residual iron (Fe) and inevitable impurities.

5. The steel sheet of claim 4, wherein the composition of the base steel sheet further comprises, by wt %, one or more among a sum of one or more selected from a group consisting of Cr, Mo, and W: 0.01% to 4.0%, a sum of one or more selected from a group consisting of Ti, Nb, Zr, and V: 0.001% to 0.4%, Cu+Ni: 0.005% to 2.0%, Sb+Sn: 0.001% to 1.0%, and B: 0.0001 to 0.01%.

6. A manufacturing method of a steel sheet for a hot press formed member, comprising:
   aluminum plating a surface of a base steel sheet and coiling to obtain an aluminum plated steel sheet;
   annealing the aluminum plated steel sheet to obtain an aluminum alloy plated steel sheet; and
   cooling the aluminum ahoy plated steel sheet, wherein an amount of the aluminum plating is 30 g/m² to 200 g/m² based on one side of the steel sheet,
   a cooling rate after the aluminum plating is 20° C. sec or less until a temperature is 250° C.,
   coiling tension is 0.5 Kg/mm² to 5 Kg/mm² during coiling,
   the annealing is performed for 30 minutes to 50 hours in a heating temperature range of 550° C. to 750° C. in a batch annealing furnace,
   when heating is performed from room temperature to the heating temperature during the annealing, an average temperature increase rate is 20° C./h to 100° C., and
   a difference between atmospheric temperature and a temperature of the steel sheet in the batch annealing furnace is 5° C. to 8 0° C., thereby producing the steel sheet of claim 1.

7. The manufacturing method of the steel sheet of claim 6, wherein the base steel sheet has a composition including, by wt %, carbon (C): 0.04% to 0.5%, silicon (Si): 0.01% to 2%, manganese (Mn): 0.01% to 10%, aluminum (Al): 0.001% to 1.0%, phosphorus (P): 0.05% or less, sulfur (S): 0.02% or less, nitrogen (N): 0.02% or less, and residual of iron (Fe) and inevitable impurities.

8. The manufacturing method of the steel sheet of claim 7, wherein the composition of the base steel sheet further comprises, by wt %, one or more among a sum of one or more selected from a group consisting of Cr, Mo, and W: 0.01% to 4.0%, a sum of one or more selected from a group consisting of Ti, Nb, Zr, and V: 0.001% to 0.4%, Cu+Ni: 0.005% to 2.0%, Sb+Sn: 0.001% to 1.0%, and B: 0.0001% to 0.01%.

* * * * *